United States Patent Office 3,439,897
Patented Apr. 22, 1969

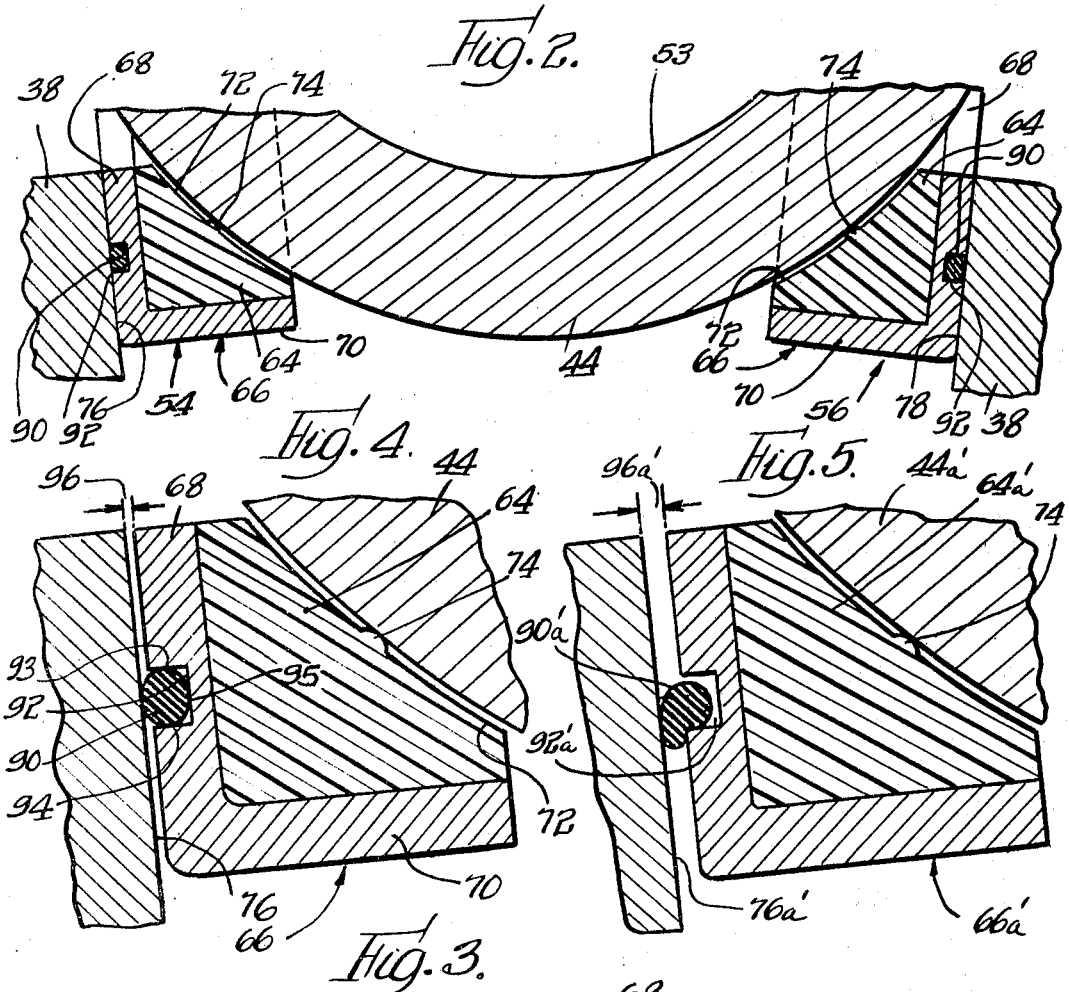
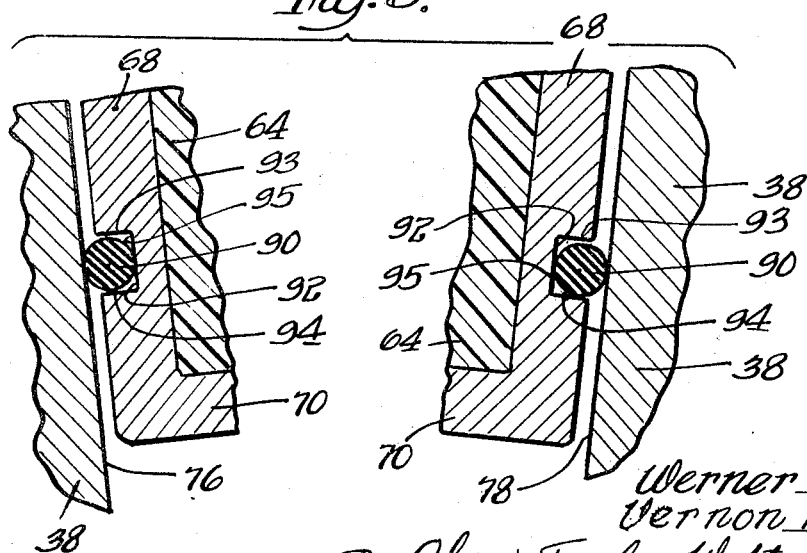

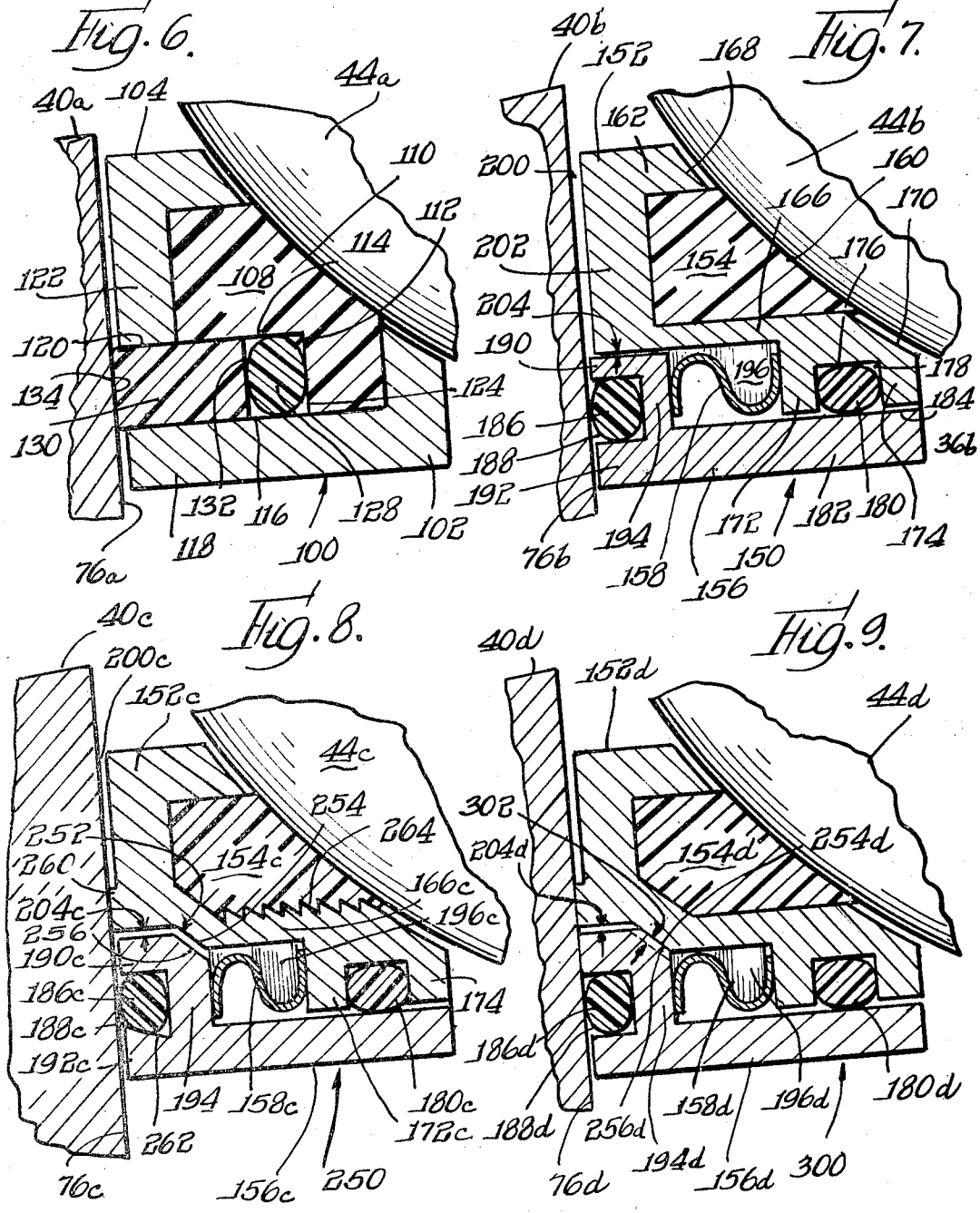

3,439,897
BALL VALVE ASSEMBLY WITH BOTH HIGH AND LOW PRESSURE SIDE SEALS
Werner K. Priese, Barrington, and Vernon E. Robbins, Arlington Heights, Ill., assignors to Hills-McCanna Company, Carpentersville, Ill., a corporation of Illinois
Filed June 28, 1966, Ser. No. 561,321
Int. Cl. F16k 5/02, 45/00
U.S. Cl. 251—170                                      9 Claims

ABSTRACT OF THE DISCLOSURE

A valve assembly including a body defining a chamber with first and second fluid passages formed therein and communicating with the chamber, first and second support surfaces each extending about an inner end of one of the passages, a flow control member mounted for rotation in the chamber so as to regulate the flow of fluid through the passages and a first and second valve seat positioned in the chamber on opposite sides of the flow control member, each of the valve seats abutting a respective support surface and each valve seat including rigid support means having first sealing means mounted thereon and located between the support means and the flow control member and second sealing means mounted thereon and located between the support means and a respective support surface.

---

The present invention relates to a seal assembly and more particularly to a seal assembly for a ball valve.

One object of the invention is to provide a ball valve which achieves an improved and highly advantageous sealing against the valve ball of the seat on the high pressure side of the valve, while at the same time providing a virtual immunity to damage by high fluid pressure of the structure which effects sealing of the valve ball.

Another object is to provide a ball valve which effects a highly effective sealing against the valve ball of valve seats on both the high and low pressure sides of the valve by means of structure capable of maintaining its effectiveness over a long service life even though the valve is exposed to high fluid pressure.

Another object is to provide an improved ball valve which utilizes the force of a resilient polymeric pressure ring to great advantage to urge a coacting valve seat into effective sealing engagement with the valve ball, while at the same time automatically protecting the pressure ring from destructive force of fluid pressure, to the end that the valve has the capability of operating efficiently and effectively over a long service life.

Another object is to provide an improved ball valve which operates dependably over a long service life to provide an effective sealing against the valve ball of the valve seat on the high pressure side of the valve, while at the same time using the force of fluid pressure on the valve ball to effectively engage the ball with the seat on the low pressure side of the valve.

Another object is to provide a ball valve as recited in the previous objects in which sealing of the ball is effected by yieldable polymeric seats which directly engage and seal against the ball.

Another object is to provide an improved ball valve having sealing capability and dependability which make the valve especially advantageous in "block and bleed" service. In general, "block and bleed" service is an environment which requires that a valve be capable, when closed, of preventing the flow of fluid from either side of the valve into the valve ball chamber even though the chamber is drained of fluid.

Another object is to provide an improved ball valve in which the characteristics recited in the previous objects are achieved by means having a highly practical construction which is well adapted for manufacture and use on a commercial basis.

Other objects and advantages will become apparent from the following description of the exemplary embodiment of the invention illustrated in the drawings, in which:

FIG. 2 is a fragmentary sectional view of the illustrated valve embodying the invention, showing on an enlarged scale the positional relationships of the valve seats to the valve ball upon initial assembly with the valve in a closed position;

FIG. 3 is an enlarged fragmentized sectional view similar to FIG. 2 but showing the relationships of the pressure rings to the valve seats before the pressure rings are compressed;

FIG. 4 is an enlarged sectional view similar to the left end portion of FIG. 2, but illustrating the positional relationship of the parts coacting with the seat on the upstream side of the valve when the valve is closed against differential fluid pressure;

FIG. 5 is a view similar to FIG. 4 but illustrating how the pressure ring coacting with the valve seat on the high pressure side of the valve could be damaged by fluid pressure if excessive clearance between parts coacting with the ring were allowed to develop;

FIG. 6 is an enlarged sectional view of a left end portion of a second embodiment of the seal assembly;

FIG. 7 is an enlarged sectional view of a left end portion of a third embodiment of the seal assembly wherein a spring member is utilized to maintain sealing engagement between the valve ball and the body of the valve;

FIG. 8 is an enlarged sectional view of a left end portion of a fourth embodiment of the invention; and FIG. 9 is an enlarged sectional view of a left end portion of still another embodiment of the seal assembly.

Figure 1:
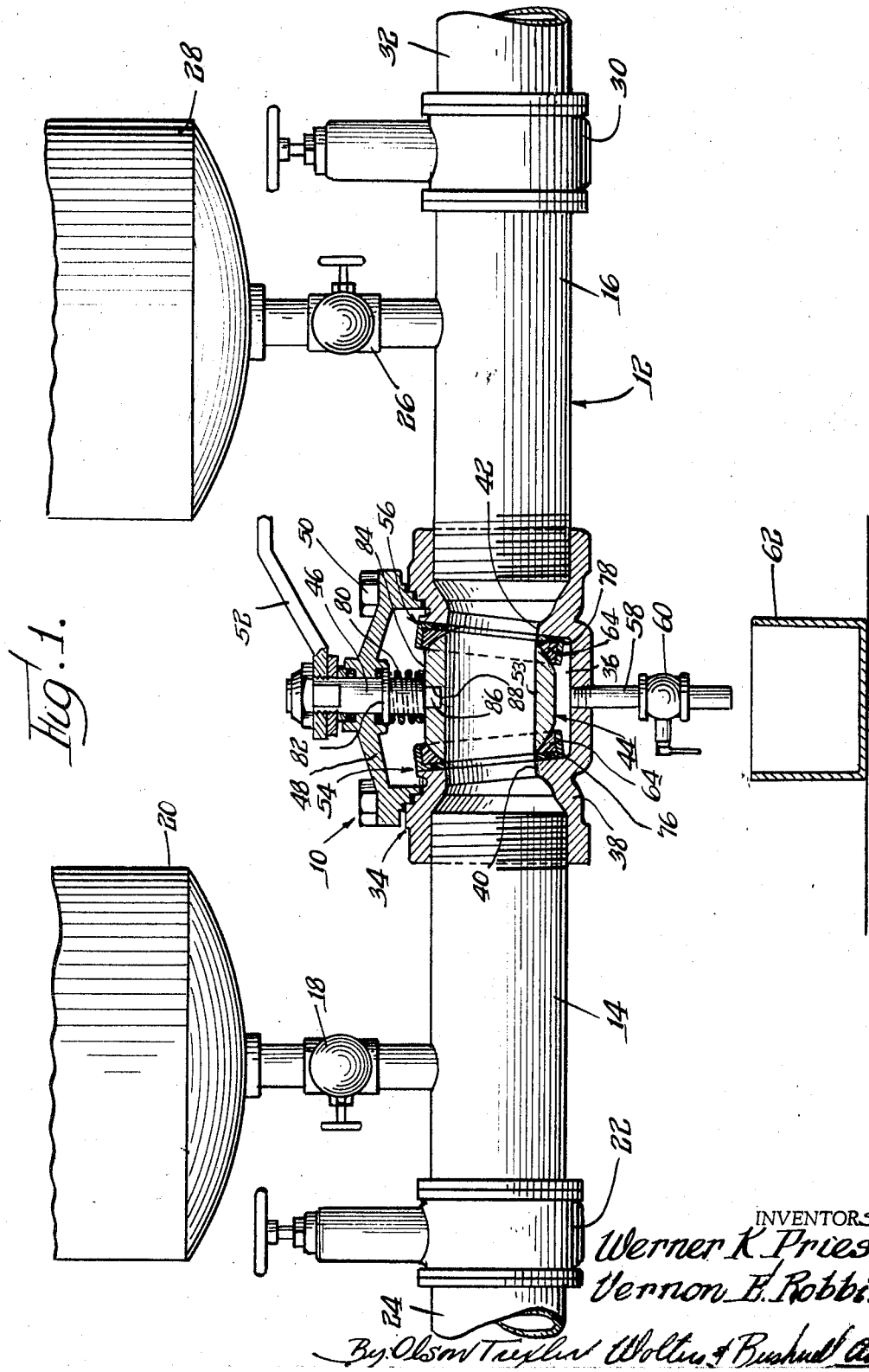
FIGURE 1 is an elevational view showing in section an open valve constructed in accordance with the invention and illustrating the valve connected with manifolding which typifies "block and bleed" service.

Referring to the drawings in greater detail, the ball valve 10 forming the exemplary embodiment of the invention illustrated is connected, as shown in FIG. 1, with piping or manifolding 12 which typifies "block and bleed" service in which the valve produced by the invention is especially advantageous. "Block and bleed" service requirements, which will be more fully discussed presently, are encountered in chemical industries, and particularly in the petroleum industry where prevention of unintended mixing of fluid is especially important.

As shown, opposite ends of the valve 10 are connected to two conduits or pipes 14, 16. The pipe 14 is connected through a valve 18 with a tank 20 and is connected by a valve 22 with a pipe 24 leading to coacting equipment, not shown. The pipe 16 is connected by a valve 26 with a tank 28 and is connected by a valve 30 with a pipe 32 leading to other apparatus (not shown).

The valve 10 forming the illustrated embodiment of the invention comprises body means 34 defining an internal valve or ball chamber 36 and including a main body section 38 defining two fluid passages 40, 42 opening into opposite sides of the chamber 36. As shown, the outer ends of the two passages 40, 42 are threaded to receive the two pipes 14, 16.

A flow control ball 44 rotatably disposed in the chamber or cavity 36 between the inner ends of the passages 40, 42 is rotated between open valve and closed valve positions by an operating stem 46 journalled in a valve bonnet 48 removably secured by threaded fasteners 50 to the main body section 38 and forming a part of the body means 34. In this instance, the stem 46 is rotated by a handle 52 to turn a bore 53 in the ball 44 into and out of alignment with the passages 40, 42.

The inner ends of the flow passages 40, 42 are encircled by annular valve seats or seals 54, 56 which confront the ball 44. Although in a preferred embodiment of the invention the valve seats 54 and 56 are generally circular in configuration, it is contemplated that valve seats having an oval or similar configuration could be utilized. Therefore, the word "annular" as used herein, is intended to include oval and other similar configurations, as well as circular configurations.

The bottom of the body section 38 is drilled and tapped to receive a bleed line 58 which connects the bottom of the ball chamber 36 with a bleed valve 60 which discharges in this instance into a receptacle 62. The valve 60 can be a needle valve of low flow capacity which is dependable in preventing leakage when closed. While the valve 60 has been shown in a temporary test arrangement with a receptacle 62, it will be apparent to those skilled in the art that a similar valve can be used with the ball valve 10 in a piping system to drain the fluid which will be located in the bore 53 when the valve is turned to the blocking or off position. The use of such a bleed valve will prevent any possible intermixing of fluid from the tanks 20 and 28.

A characteristic requirement of "block and bleed" service is that the flow of fluid between the body of the valve and the valve ball is blocked, when the valve is closed, not only by a seal formed between the ball and the valve seat, but also by a seal formed between the body of the valve and the valve seat. These seals are formed between the ball and the body of the valve at a first valve seat on the upstream or high pressure side of the valve and at a second valve seat on the downstream or low pressure side of the valve. The double sealing of two valve seats prevents any leakage from the passages 40 and 42 into the chamber or cavity 36, when the valve 10 is closed, regardless of which passage is exerting the greater fluid pressure against the side of the valve ball.

To test the seals in the valve 10, the valve is closed while one or both of the connecting pipes 14 and 16 contain fluid under pressure. The test or bleed valve 60 is then opened to drain the ball chamber 36. After an initial draining of the fluid in the chamber 36, a continuing discharge through the test or bleed valve 60 indicates that a leakage is occurring past one of the valve seats or seals 54, 56. Stoppage of the flow of liquid from the test valve 60, after the chamber 36 has drained in a normal manner, indicates that the two seals formed at the seat of the valve on the high pressure side of the valve are not leaking. The seals at the other valve seat can be tested by merely applying the high pressure fluid to the opposite side of the valve.

It will be obvious that, if both sides of the valve are subjected to pressure while the valve 10 is closed and there is no flow of fluid from the open test valve 60, then there is no leakage past either of the valve seats 54, 56. In this manner, the effectiveness of the seal formed between the valve seats and the ball can be tested while the valve 10 is in service to make sure that the valve can be depended upon to block the flow of fluid therethrough.

The dependability of a valve is quite important in some industries, such for example as the petroleum industry. In the petroleum industry it is a common practice to utilize a single valve to separate two sources of different fluids, such as high-octane gasoline and semi-finished lubricating oil. It is extremely important that the gasoline does not leak past the valve and into the lubricating oil, and conversely that the oil does not leak past the valve and contaminate the gasoline. With reference to the drawings, the valve 10 may be relied upon to block mixing of fluid from the two tanks or sources 20, 28 when either or both of the valves 18 and 26 are open.

Having reference to FIGS. 1 and 2, each of the valve seats 54, 56 on the valve 10 comprises an annular seat or sealing ring 64 formed of a yieldable polymeric material such, for example, as polytetrafluoroethylene, sold commercially under the name "Teflon." The two seats 54, 56 are structurally identical but are turned relative to each other to confront opposite sides of the ball 44.

The yieldable polymeric seat or sealing ring 64 of each seat 54, 56 has a generally triangular form in transverse section, FIG. 2, and is supported by a metal holder ring 66 which has a generally flat radial leg 68 joined at a right angle to a cylindrical peripheral leg 70. Each seat ring 64 projects somewhat from its holder ring 66 toward the center of the ball 44 and defines an annular ball sealing surface 72 confronting the ball and having generally the shape of a segment of a spherical surface conforming to the ball. A very small annular bead 74 (having a height of four to eight thousandths of an inch) is formed on each ring 64 to project initially from the medial portion of the surface 72 toward the ball to produce an annular line of intensified sealing pressure on the ball when the valve is first assembled.

The two seats 54, 56 are slidably supported on two flat support surfaces 76, 78 formed on the body section 38 in encircling relation to the inner ends of the respective passages 40, 42. The two surfaces 76, 78, FIGS. 1 and 2, converge slightly toward each other in a direction away from the bonnet 48 along the axis of the operating stem 46.

The two seats 54, 56 and the ball 44 are continuously urged in the direction in which the support surfaces 76, 78 converge by means of a helical compression spring 80 encircling the stem 46 between an inner collar 82 on the stem and a spring seat 84 on the ball.

A tang 86 on the inner end of the stem 46 fits loosely within a ball slot 88 to provide a driving connection to the ball which provides for limited "floating" movement of the ball within the chamber or cavity 36 under the force of fluid pressure on the ball.

Hence, when the valve is closed against a differential fluid pressure, the force of fluid pressure acting on the high pressure side of the ball urges the ball toward the valve seat encircling the passage 40 or 42 which is under the lower pressure. This positive force of differential fluid pressure acting on the ball urges the ball into tight seating engagement with the yieldable polymeric valve seat ring 64 encircling the passage 40 or 42 which is under the lower fluid pressure.

Highly effective sealing engagement of the valve seat encircling the inner end of the passage 40 or 42 which is under the higher fluid pressure is assured by use of a resilient polymeric pressure ring 90 to urge each of the valve seats 54, 56 continuously toward the ball 44.

As illustrated in FIG. 2, which shows the parts on a larger scale, the radial leg 68 of the holder ring 66 for each valve seat 54, 56 is machined to define along a medial portion of the leg 68 a rectilinear groove 92 which confronts the opposing one of the flat support surfaces 76, 78. The grooves 92 are formed by the sidewalls 93 and 94 which are interconnected by base walls 95. The groove 92 formed in each holder leg 68 is designed to receive the previously mentioned pressure ring 90 for the corresponding valve seat and has a depth which is equal to approximately two-thirds of the width of the groove. In a ball valve in which the ball 44 has a diameter of five inches and the valve seats 54, 56 have an inner diameter of approximately three inches, each groove 92 can have a depth, for example, of substantially .10 of an inch and a width of substantially .16 of an inch.

Each compression ring 90 has a diameter in transverse section such that, upon being fitted into its support groove 92, the ring initially projects a substantial distance outwardly beyond the face of the coacting leg 68 which confronts the adjacent one of the support surfaces 76, 78. Moreover, the cross-sectional diameter of each ring 90, in radial section, is such that the ring projects outwardly of the groove 92. The groove 92 being formed with a volume which is at least fifteen to twenty percent larger than the volume of the ring 90 to enable the ring to be compressed into the groove. The positions of the pressure rings 90 before being compressed by the surfaces 76, 78 are illustrated in FIG. 3.

When the valve 10 is assembled, the spring 80 urges the ball 44 and seats 54, 56 in the direction in which the support surfaces 76, 78 converge, to produce a wedging action which compresses the pressure rings 90 to the extent that space between each of the holder legs 68 and the adjacent support surface is virtually eliminated, FIG. 2.

The resilient polymeric material from which the rings 90 are formed should have a high order of resiliency which provides in each ring the inherent physical capability of strongly urging the coacting valve seat toward the ball. Rings 90 formed of rubber are very suitable in valves used to control fluids which are not harmful to rubber. In valves used to handle fluids which are incompatible with rubber, the rings 90 are formed of a resilient polymeric material which is not damaged by the particular fluid handled by each particular valve.

When the valve 10 is closed against a differential fluid pressure, the force of fluid on the ball 44 causes the seat support leg or abutment 68 on the seat at the low pressure side of the valve to abut firmly against the coacting support or abutment surface 76 or 78. Also, the force of fluid pressure on the ball causes the yieldable polymeric seat ring 64 at the low pressure side of the valve to yield somewhat under load with the consequence that there is a tendency of the ball to recede somewhat from the valve seat encircling the passage 40 or 42 which is under the higher fluid pressure.

The pressure ring 90 associated with the valve seat on the high pressure side of the valve reacts on the adjacent support or abutment surface 76 or 78 to accomplish simultaneously two functions. It forms a tight seal between the opposing support surface 76, 78 and the adjacent valve seat. The O-ring 90 at the high pressure side of the valve also acts on the adjacent valve seat to urge it firmly against the valve ball to follow up the valve ball, in a sense, to maintain a tight seal with the valve ball. This action of the pressure ring at the high pressure side of the valve is illustrated in FIG. 4. The action of the pressure ring 90 at the high pressure side of the valve in sealing against the surface 76, 78 and in holding the coacting valve seat tightly against the valve ball prevents the passage of fluid even under high pressure from the high pressure one of the passages 40, 42 past the valve ball into the chamber 36.

However, it may be observed, with reference to FIG. 4, that the action of the pressure ring 90 at the high pressure side of the valve on the adjacent valve seat urges the adjacent holder leg 68 away from the adjacent support surface 76 or 78 to create a space or clearance between these elements which is identified in FIG. 4 by the number 96.

If the space 96 developed between the support leg 68 and the support surface 76 or 78 at the high pressure side of the valve exceeds a certain maximum value, which value for practical purposes may be regarded as ten thousandths of an inch (.010), depending on the fluid pressure and the hardness of the pressure ring, the pressure of fluid will force the pressure ring 90 at the high pressure side of the valve out of its coacting groove 92 into the space between the adjacent leg 68 and the support surface for the leg. The result of this would be damage to the pressure ring with consequent damage to the valve.

The action which could occur if the space between a holder leg 68 and the opposed support surface exceeded ten thousandths of an inch is illustrated in FIG. 5 wherein components similar to the actual elements of the valve 10 are identified with the same reference number, with the addition of the subscript a'. FIGURE 5 shows how the force of fluid pressure could extrude a pressure ring 90a' out into a space 96a' which exceeded ten thousandths of an inch in width.

Development of a space between either of the legs 68 and its coacting support surface 76 or 78 is prevented in the valve 10 by the action of the spring 80 in urging the ball 44 and seats 54, 56 in the direction in which the support surfaces 76, 78 converge. While the spring 80 may not have sufficient strength to move the ball and seats along the surfaces 76, 78 when the valve is closed against differential pressure, the spring acts when the ball is open to take up clearance between the seat holder legs 68 and the support surfaces 76, 78 so that, upon closure of the valve, the clearance which develops between the leg 68 on the high pressure side of the valve and its support surface is restricted essentially to the compression of the polymeric seat ring 64 at the low pressure side of the valve and does not become sufficient to allow extrusion of the pressure ring 90 at the high pressure side of the valve from its coacting groove 92. Consequently, the valve 10 operates efficiently and dependably to fulfill its intended purpose over an extended service life.

For purposes of affording a more complete understanding of the invention, it is advantageous now to provide a functional description of the mode in which the component parts thus far identified cooperate. The valve assembly 10 includes a longitudinally extending body 38 in which are formed a pair of passages 40 and 42. The passages 40 and 42 conduct fluid into the central chamber 36 in which a flow control member or ball 44 is positioned. The joint or passage between the ball and the inner end of the passages 40 and 42 is sealed by a pair of annular valve seats 54 and 56. The annular valve seats 54 and 56 include a first inner sealing member or ring 64 which is positioned in sliding, sealing engagement with an exterior surface of the ball 44. A second annular sealing member or compression ring 90 is mounted in the annular holder ring 66 which extends around an exterior surface of the inner sealing member 64. The compression ring 90 presses the inner sealing member 64 into firm engagement with the ball of the valve.

When the valve is moved to the closed position, high pressure fluid in one of the passages will force the valve toward the opposite passage and into firm sealing engagement with the valve seat positioned at the inner end of the opposite passage. The valve seat adjacent the inner end of the high pressure passage will also be forced into firm sealing engagement with the exterior surface of the ball by the compression ring 90 which presses the valve seat toward the opposite passage and the ball of the valve. The compression ring 90 will, simultaneously, form a fluid-tight seal between the body of the valve and the holder ring 66 to prevent fluid from leaking between the holder ring 66 and the body of the valve into the chamber 36.

The ball of the valve is resiliently forced into sealing engagement with the valve seats 54 and 56 by the spring member 80. The spring member 80 forces the valve seat downwardly toward the apex of the inwardly converging valve seats 54 and 56. This resilient downward force will press the seats firmly against the inwardly converging surfaces 76 and 78 of the valve body 38 to form a tight seal between the valve body 38, the valve seats 54 and 56, and an exterior surface of the valve ball 44.

Referring now to FIGS. 6 through 9, a plurality of different embodiments of the valve seats 54 and 56 are shown. In these modified forms of the invention like numerals have been used to designate like parts with the suffix a through d being utilized to distinguish the elements associated with FIGS. 6 through 9 from those associated with FIGS. 1 through 5. Considering the embodiment illustrated in FIG. 6, a cross-sectional view of a left end portion of a valve seat 100 is shown. The valve seat 100 is located between the ball 44a of the valve and the surface 76a of the body of the valve, in a position similar to that of the valve seat 54 of FIGS. 1 to 5. It will be apparent, of course, that a second valve seat, similar to the valve seat 100, will be provided for the opposite or right hand side of the valve.

The valve seat 100 includes a pair of spaced-apart annular base rings 102 and 104. Secured to the base rings 102 and 104 is an annular seat ring 108 which is formed of a fluorocarbon resin, such as polytetrafluoroethylene which may be filled with a pulverulent ceramic material. The seat ring 108 has an arcuate inner surface 110 which is positioned in firm sealing engagement with the ball 44a. The seat ring 108 maintains a light seal with the ball 44a for a long period of time due to the pulverulent ceramic material in the seat ring.

An outwardly extending annular groove or channel 112 is formed in the valve seat 100. The groove or channel 112 is defined by an annular outwardly extending surface 114 of the seat ring 108 and an inner annular surface 116 of a leg 118 of the base member 102. An outer end portion of the groove 112 is also defined by an annular radially outermost surface 120 of a leg 122 of the base member 104. The annular sidewalls 114 and 116 of the groove 112 are interconnected by a base surface or wall 124.

Positioned within the groove 112 adjacent to the base wall 124, is an annular resilient O-ring member 128 formed of a suitable polymeric material. Axially abutting the O-ring member 128 is an annular cylindrical sealing member 130 which is slidably mounted in sealing engagement with the sidewalls 114, 116 and 120 of the groove 112. An inner or base surface 132 of the sealing member 130 is positioned in abutting contact with the resilient O-ring 128. An axially outermost surface 134 of the sealing member 130 is positioned in sealing engagement with the inwardly converging support surface 76a. The sealing member 130 is formed of polytetrafluoroethylene which may be filled with a pulverulent ceramic material.

The valve seat 100 is normally pressed to the left, as viewed in FIG. 6, by the ball valve 44a under the influence of a spring member, similar to the spring member 80. When the ball valve 44a is moved to a closed position, the ball 44a presses the axially outermost leg 122 and the sealing member 130 into engagement with the support surface 76a. When the valve seat 100 is in this position, the O-ring seal 128 is compressed by the sealing member 130 which is forced axially inwardly, from the position shown in FIG. 6, against the O-ring. It is apparent that the resilient O-ring urges the sealing member 130 firmly against the support surface 76a. If a high pressure fluid is applied to the left of the ball 44a, the ball 44a is moved to the right, as shown in FIG. 6. When the ball is moved to the right, the sealing member 130 is maintained in contact with the support surface 76a by the resiliently expanding O-ring 128. The O-ring simultaneously presses the seat ring 108 against the ball 44a. Thus, a tight seal is maintained between the ball 44a and the valve seat 100 and between the valve seat 100 and the support surface 76a. It should be noted that the O-ring 128 presses against the axially inner surface 132 of the sealing member 130 to force the seat ring 108 axially inwardly into sealing engagement with the ball 44a in much the same manner as the sealing ring 90 of the embodiment of FIGS. 2 to 5 forces the seat ring 64 into sealing engagement with the ball 44.

A third embodiment of the invention is shown in FIG. 7. In this embodiment a valve seat or seal 150 is mounted between the ball or flow control member 44b of a valve and the inwardly converging support surface 76b. The seat assembly 150 includes a first base member 152 in which an annular seat ring or seal 154, formed of polytetrafluoroethylene, is mounted. A second radially outward base member 156 is positioned in sealing engagement with the support surface 76b and the radially inward base member 152. The base member 152 is pressed axially inwardly by a spring member 158 to maintain a surface 160 of the seat ring 154 in firm sealing engagement with the ball 44b of the valve.

The seat ring 154 is mounted between axially inwardly extending legs or side walls 162 and 166 of the base member 152. The annular legs 162 and 166 both have arcuate annular surfaces 168 and 170 positioned adjacent to, but separated from, the ball 44b of the valve. The leg 166 of the base member 152 includes a pair of radially outwardly extending side walls 172 and 174 which are connected to the base wall or surface 176 to define an annular, radially outwardly extending, groove 178. An O-ring seal 180 of a suitable resilient material, such as polytetrafluoroethylene, is positioned in the annular groove 178. The seal 180 is normally protruding outwardly of the groove 178 and in sealing contact with an axially extending leg 182 of the base member 156. When the base member 152 is displaced radially, relative to the base member 156, the annular seal 180 will expand and contract to maintain a tight sealing engagement with an annular inner surface 184 of the leg 182.

A second annular sealing member or O-ring 186, formed of a suitable resilient polymeric material, such as polytetrafluoroethylene, is positioned in an annular axially outwardly extending groove 188 in the base member 156. The groove 188 is defined by an axially outwardly extending side wall 190 which is connected to a radially outer side wall 192 by a base wall 194. The sealing member 196 protrudes outwardly of the groove 188 to maintain a fluid-tight joint or seal between the inwardly converging support surface 76b and the base member 156.

An annular chamber or cavity 196 is formed between the base members 152 and 156 by the axially extending leg member 172 and the base wall 194. The waved-form spring 158 is positioned within the chamber 196 to press the base member 152 axially inwardly relative to the base member 156. The spring member 158 insures that the sealing member 186 will be pressed against the support wall 76b and that the annular seat ring 154 will be pressed in sealing engagement with an outer surface of the valve ball 44b. A fluid passage 200 is formed between the annular base leg 202 of the base member 152. The passage 200 is in direct fluid communication with the fluid passage 40b. A second passage 204 is provided between the radially innermost side wall 190 of the groove 188 and the radially outermost side wall 166 of the base member 152. The fluid passages 200 and 204 provide fluid communication between the chamber 196 and the passage 40b. Thus, high pressure fluid in the passage 40b can enter the passages 200 and 204 and flow into the chamber 196. The high pressure fluid will force the radially extending base wall 194 and the sealing ring 180 toward the support surface 76b. Similarly, the high pressure fluid in the chamber 196 and passage 200 will press the seat ring 154 into tight sealing engagement with the ball 44b. The annular sealing member 180, in the groove 178, provides a fluid-tight joint between the inner surface 184 of the base member 156 and the base member 152 so that high pressure fluid will not leak between the two base members into the chamber 36b. Thus, the chamber 196 enables high pressure fluid from the passage 40b to be utilized for maintaining the valve seat in tight sealing engagement with both the valve ball and body.

Referring now to FIG. 8, still another embodiment of the valve seat is shown. The valve seat 250, of FIG. 8, is generally similar to that of FIG. 7. Therefore, in the embodiment set forth in FIG. 8 like numerals, corresponding to those of FIG. 7, have been used to designate like parts with the suffix c being employed to distinguish the elements associated with FIG. 8. The seat assembly 250 differs from the assembly 150 in the construction of the chamber or cavity 196c and passages 204c and 200c which connect the chamber 196c with the main fluid passage 40c of the valve. The passage 204c includes a radially outwardly extending section 252 leading into the chamber 196c. The section 252 of the passage 204c is formed between an annular surface 254 of the base member 152c and an annular surface 256 positioned radially outwardly of the annular surface 254 formed by the base member 156c.

An axially outwardly extending blocking protuberance 260 is formed in the axially outer end portion of the base member 152c. The blocking protuberance 260 prevents the ball 44c of the valve from pressing, under the influence of a resilient spring, similar to the spring 80, the base member 152c axially outwardly for a sufficient distance to bring the adjacent surfaces 254 and 256 into an abutting relationship. Therefore, the section 252 of the passage 204c cannot be blocked by axially outward movement of the base member 152c relative to the base member 156c.

The groove 188c is provided with an angled radially inwardly extending side surface 262 which retains the sealing member 186c in the groove. From an inspection of FIG. 8, it will be apparent that the sealing member 186c has a larger normal or uncompressed diameter than the mouth of the groove 188c. Thus, the surface 262 securely retains the sealing member 186c in the groove 188c. The axially inwardly extending surface 262 also tends to prevent the seal member from being extruded between the axially outwardly extending side walls 192c and the support surface 76c.

The seat ring 154c is retained in the base member 152c by a plurality of axially inwardly extending teeth 264 which project radially inwardly and axially rearwardly from the side wall 166c of the base member 154c. The teeth 264 prevent the seat ring 154c from being dislodged from the base member 154c.

Still another embodiment of the invention is shown in FIG. 9. This embodiment, which is similar to the embodiment of FIG. 8, is designated by numerals, similar to those used in FIG. 8, to which have been added the suffix d to distinguish the elements of FIG. 9 from those of FIG. 8. In the seat assembly 300, shown in FIG. 9, a bleed notch 302 is provided between the base members 152d and 156d. The bleed notch 302 is formed by a groove or recess in the radially inwardly extending side wall 194d of the base member 156d. The notch 302 performs the same function as the passage 252 in the embodiment shown in FIG. 8, that is, the notch 302 interconnects the axially extending passage 204d with the annular chamber or cavity 196d. In this embodiment of the invention the base member 154d will normally engage the base member 156d at the two mating surfaces 254d and 256d.

The operation of the valve seat constructed as illustrated in FIGS. 6 to 9 will be apparent from the foregoing description. However, the operation may be briefly summarized as follows: The valve seat assembly in the embodiments of FIGS. 6 to 9 includes, broadly speaking, two relatively movable sealing members. The first sealing member is maintained in sealing engagement with an exterior surface of the ball of the valve. The second sealing member is maintained in sealing engagement with an inwardly converging side wall 76 of the valve body. These two sealing members are forced outwardly relative to each other by means of a resilient annular spring member positioned between the two sealing members. In the embodiment shown in FIG. 6, a resilient annular O-ring is utilized to as a spring member force the sealing member 130 into sealing engagement with the wall 76a of the valve body. The O-ring 128 also forces the sealing member 108 into sealing engagement with the ball of the valve.

In the embodiment shown in FIGS. 7 through 9 a spring member 158 is utilized to force a base member 156 which has an outwardly projecting sealing member 186 into tight sealing engagement with the inwardly converging base wall 76. Similarly, a second sealing member 154 is pressed, by the spring 158, into sealing engagement with an inner surface of the ball 44. Although a wave spring is shown in FIGS. 7 to 9, it is contemplated that a coil or other type spring could be used for the spring 158. A third sealing member 180 is provided to seal the joint between the base members 152 and 156.

In the embodiments of FIGS. 7 through 9, high pressure fluid enters a chamber 196 through a passage between the two base members. The fluid in the chamber 196 will force the radially outwardly extending base member 156 into sealing engagement with the support surface 76. The fluid also tends to force the radially inner base member 152 into sealing engagement with the ball 44 of the valve. While the support surfaces 76 and 78 have been illustrated as being positioned at an angle to the vertical, it will be apparent that seals could equally as well be used with vertical support surfaces.

It will be appreciated that the invention is not limited to use of the particular structure illustrated, but includes the use of alternatives and equivalents within the spirit and scope of the invention as defined by the claims. Thus, although in the preferred embodiment circular valve seats and sealing members have been illustrated, it is contemplated that oval and other noncircular shapes could be used. Therefore, annular, as used in the claims, is intended to include both circular and noncircular shapes.

What is claimed is:

1. A valve assembly comprising: a body means defining a chamber, first and second fluid passage means formed in said body means and having an inner end opening into said chamber, a first support surface extending around an inner end of said first passage means, and a second support surface extending around an inner end of said second passage means; flow control means extending through said body means into said chamber for regulating the flow of fluid through said first and second passage means; a first valve seat positioned in said chamber in sliding engagement with said flow control means and abutting said first support surface; and a second valve seat positioned in sliding engagement with said flow control means and abutting said second support surface; said first valve seat including a first rigid support means, a first sealing member mounted on said first rigid support means and positioned in sealing engagement with said flow control means, and a second sealing member mounted on said first rigid support means, said second sealing member protruding outwardly of said first rigid support means to maintain a sealing relationship with said first support surface even when said flow control means is moved relative to said first support surface; said second valve seat including a second rigid support means, a third sealing member mounted on said second rigid support means and positioned in sealing engagement with said flow control means, and a fourth sealing member mounted on said second rigid support means, said fourth sealing member protruding outwardly of said second rigid support means to maintain a resilient sealing relationship with said second support surface even when said flow control means is moved relative to said second support surface, and wherein said first rigid support means includes first and second relatively movable base members, with a first annular cavity means being formed between said first and second base members; a third fluid passage extends from said chamber means to said first cavity means to enable fluid from said first fluid passage means to enter said first cavity means; said second rigid support means includes third and fourth relatively movable base members, with a second annular cavity means being formed between said third and fourth base members; and a fourth fluid passage means extends from said chamber means to said second cavity means to enable fluid from said second fluid passage means to enter said second cavity means.

2. A seal assembly comprising: a first rigid annular base member; a first resilient annular sealing member mounted in said first base member, said first sealing member having an arcuate outer surface for sealing engagement with a surface of a flow control member for a valve; a second rigid annular base member encircling said first base member, said first base member being movable axially relative to said second base member; a second resilient annular sealing member mounted in a first annular groove means in said first base member, said second annular sealing member being positioned in sealing engagement with said second base member to provide a fluid-tight joint between said first and second base member; and a third resilient annular sealing member mounted in a second annular groove means in said second base member, said third annular sealing member being positioned for sealing engagement with the body portion of the valve.

3. An assembly as set forth in claim 2 wherein: said second annular sealing member is resiliently movable from a first normal position extending outwardly of said first annular groove means to a second position compressed against an inner surface of said first annular groove means; and said third annular sealing member is resiliently movable from a first normal position extending outwardly of said second annular groove means to a second position compressed against an inner surface of said second annular groove means.

4. An assembly as set forth in claim 2 further including: a spring means enclosed in a chamber means defined by adjacent surfaces of said first and second base members to urge said first base member axially outwardly relative to said second base member.

5. An assembly as set forth in claim 2 wherein: said first annular groove means includes a pair of radially outwardly extending side walls, said second annular sealing member being positioned between said radially outwardly extending side walls, said first base member being movable radially relative to said second base member to move said second annular sealing member from a first normal position to a second position compressed against inner surfaces of said radially outwardly extending side walls; and said second annular groove means includes a pair of axially outwardly extending side walls, said third annular sealing member being positioned between and protruding outwardly of said axially extending side walls.

6. A valve assembly comprising: a body means defining a cavity, first and second fluid passage means having inner ends opening into said cavity, a first support surface extending around an inner end of said first fluid passage means, and a second support surface extending around an inner end of said second fluid passage means; flow control means extending through said body means into said chamber for regulating the flow of fluid through said first and second passage means; a first valve seat positioned in said cavity in sliding engagement with said flow control means and abutting said first support surface; and a second valve seat positioned in said cavity in sliding engagement with said flow control means and abutting said second support surface; said first valve seat including a first rigid annular base member, a first resilient annular sealing member mounted on said first base member, said first sealing member having an arcuate surafce in sealing engagement with said flow control means, a second rigid annular base member encircling said first base member, said first base member being movable axially relative to said second base member, a second resilient annular sealing member mounted on said first base member, said second annular sealing member being positioned in sealing engagement with said second base member to provide a fluid-tight joint between said first and second base members, and a third resilient annular sealing member mounted on said second base member, said third annular sealing member being positioned in sealing engagement with said first support surface even when said flow control means is moved relative to said first support suface; said second valve seat including a third rigid annular base member; a fourth resilient annular sealing member mounted on said third base member, said fourth sealing member having an arcuate outer surface in sealing engagement with a surface of said flow control means, a fourth rigid annular base member encircling said third base member, said third base member being movable axially relative to said fourth base member, a fifth resilient annular sealing member mounted on said third base member, said fifth annular sealing member being positioned in sealing engagement with said fourth base member to provide a fluid joint between said third and fourth base members, and a sixth resilient annular sealing member mounted on said fourth base member, said sixth annular sealing member being positioned in sealing engagement with said second support surface even when said flow control means is moved relative to said second support surface.

7. An assembly as set forth in claim 6 wherein: said first valve seat further includes a first spring means enclosed in a first chamber means defined by adjacent surfaces of said first and second base member to urge said first base member axially outwardly relative to said second base member, a third fluid passage means extending from said cavity means to said first chamber means to provide fluid communication between said first passage means and said chamber means; and said second valve seat includes a second spring means enclosed in a second chamber means defined by adjacent surfaces of said third and fourth base members to urge said third base member axially outwardly relative to said fourth base member, a fourth fluid passage means extending from said cavity means to said second chamber means to provide fluid communication between said second fluid passage means and said second chamber means.

8. An assembly as set forth in claim 6 wherein: said first and second support surfaces converge toward each other; and spring means engages said flow control means to press said first and second valve seats against said first and second inwardly converging support surfaces.

9. A valve assembly comprising: a body means defining a chamber, first and second fluid passage means formed in said body means and having an inner end opening into said chamber, a first support surface extending around an inner end of said first passage means, and a second support surface extending around an inner end of said second passage means; flow control means extending through said body means into said chamber for regulating the flow of fluid through said first and second passage means; a first valve seat positioned in said chamber in sliding engagement with said flow control means and abutting said first support surface; and a second valve seat positioned in sliding engagement with said flow control means and abutting said second support surface; said first valve seat including first and second rigid, relatively movable base members, said second base member encircling said first base member, first and second relatively movable sealing members being positioned with respect to said flow control means and said first support surface, respectively, by means of said base members, said first sealing member being in sealing engagement with an exterior surface of said flow control means and said second sealing member being in sealing engagement with said first support surface; and a first annular member acting resiliently in compression to effect a force on both said first and second sealing members thereby to maintain said members in sealing engagement with said respective surfaces; said second valve seat including third and fourth rigid, relatively movable base members, said fourth base member encircling said third base member, third and fourth relatively movable sealing members positioned with respect to said flow control means and said second support surface respectively, by means of said base members, said third sealing member being in sealing engagement with an exterior surface of said flow control means and said fourth sealing member being in sealing engagement wtih said second support surface; and a second annular member acting resiliently undre compression to effect a force on both said third and fourth sealing members thereby to maintain said members in sealing engagement with said respective surfaces.

(References on following page)

References Cited

UNITED STATES PATENTS

| | | | |
|---|---|---|---|
| 3,006,599 | 10/1961 | Eckert | 251—172 |
| 3,058,484 | 10/1962 | Feiring | 251—171 X |
| 3,067,977 | 12/1962 | Anderson et al. | 251—172 |
| 3,154,094 | 10/1964 | Bredtschneider et al. | 251—174 X |
| 3,168,279 | 2/1965 | Anderson et al. | 251—317 X |
| 3,273,852 | 9/1966 | Ripert | 251—317 X |
| 3,301,523 | 1/1967 | Lowery | 251—317 X |
| 3,345,032 | 10/1967 | Rawstron | 251—172 |
| 3,357,679 | 12/1967 | Gulick | 251—172 |

CLARENCE R. GORDON, *Primary Examiner.*

U.S. Cl. X.R.

251—172, 174, 181, 315, 175